(12) United States Patent
Sekiguchi

(10) Patent No.: US 11,477,340 B2
(45) Date of Patent: Oct. 18, 2022

(54) INFORMATION PROCESSING SYSTEM AND APPARATUS AND NON-TRANSITORY COMPUTER READABLE MEDIUM

(71) Applicant: FUJIFILM Business Innovation Corp., Tokyo (JP)

(72) Inventor: Yumi Sekiguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 367 days.

(21) Appl. No.: 16/543,630

(22) Filed: Aug. 19, 2019

(65) Prior Publication Data

US 2020/0236244 A1 Jul. 23, 2020

(30) Foreign Application Priority Data

Jan. 18, 2019 (JP) .............................. JP2019-007013

(51) Int. Cl.
*H04N 1/00* (2006.01)
(52) U.S. Cl.
CPC ..... *H04N 1/00954* (2013.01); *H04N 1/00344* (2013.01); *H04N 1/00957* (2013.01)
(58) Field of Classification Search
None
See application file for complete search history.

(56) References Cited

U.S. PATENT DOCUMENTS

| 2019/0286401 | A1* | 9/2019 | Yasuda | G06F 3/1273 |
| 2020/0249890 | A1* | 8/2020 | Kakitsuba | G06F 3/1207 |
| 2021/0365224 | A1* | 11/2021 | Kurebayashi | G06F 3/1253 |

FOREIGN PATENT DOCUMENTS

| JP | 2001356946 | 12/2001 |
| JP | 3463020 | 11/2003 |

* cited by examiner

*Primary Examiner* — Dov Popovici
(74) *Attorney, Agent, or Firm* — JCIPRNET

(57) ABSTRACT

An information processing system is proposed. A manager manages a workflow defined by combining units of processing and generates a job to execute the workflow. A memory provides the manager to store a status of each unit of processing according to the job. Plural processors each executes a corresponding unit of processing. A processing request storage provides the manager to store a unit of processing as an execution request. A processing result storage provides each processor to store a processing result of a corresponding unit of processing after extracting the unit of processing from the processing request storage and executing the unit of processing. At a predetermined timing or when the information processing system is restarted after an occurrence of an error, an output unit outputs information indicating a status of a corresponding unit of processing, based on storage statuses of the processing request storage and the processing result storage.

18 Claims, 7 Drawing Sheets

FIG. 2A

| WORKFLOW INSTANCE DB RECORD 31 | | |
|---|---|---|
| WORKFLOW INSTANCE ID | WORKFLOW NAME | STATUS |
| ... | ... | ... |

FIG. 2B

| TASK INSTANCE DB RECORD 32 | | | | |
|---|---|---|---|---|
| TASK INSTANCE ID | TASK NAME | WORKFLOW INSTANCE ID | WORKFLOW NAME | STATUS |
| ... | ... | ... | ... | ... |

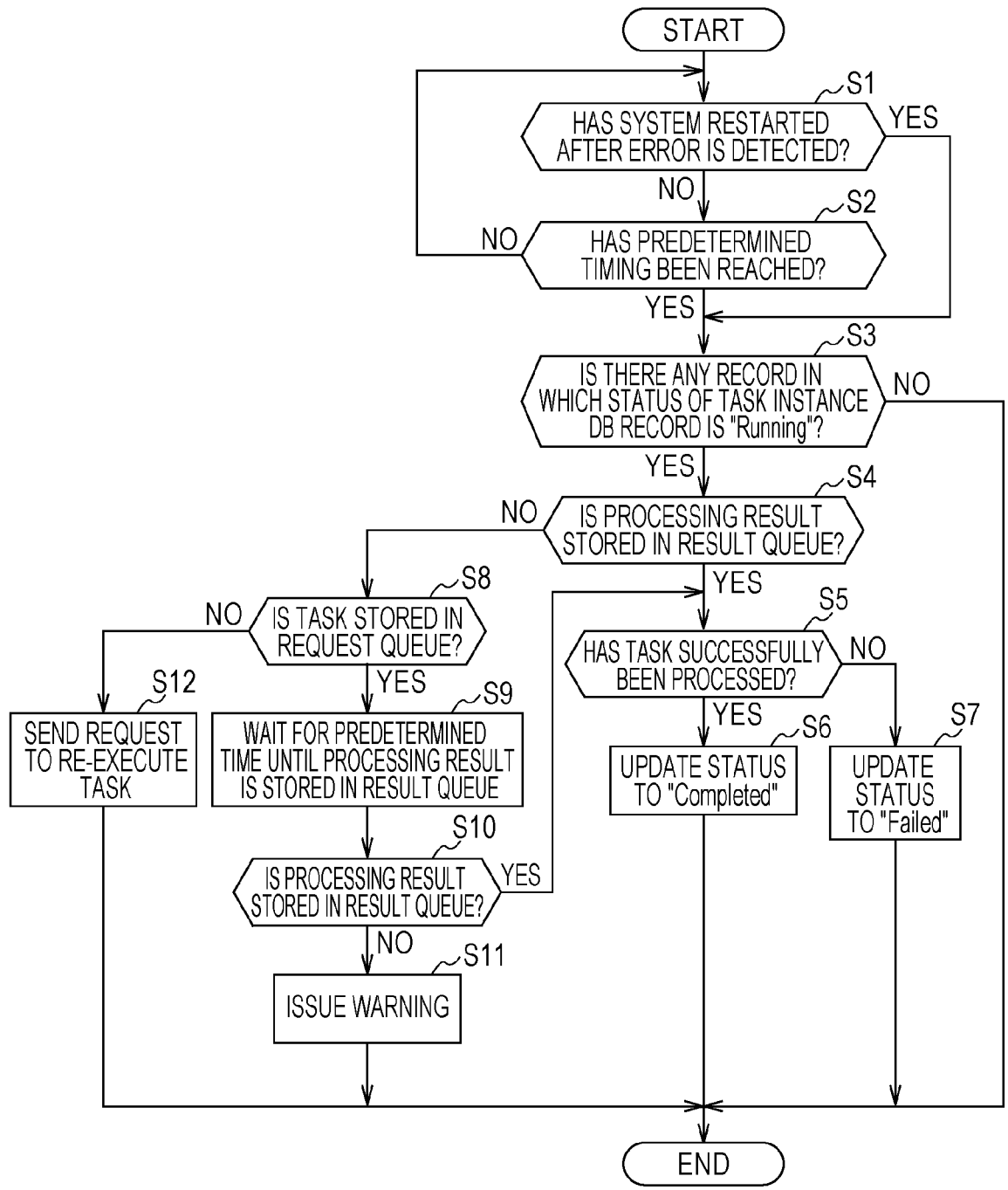

INFORMATION PROCESSING SYSTEM AND APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-007013 filed Jan. 18, 2019.

BACKGROUND

(i) Technical Field

The present disclosure relates to an information processing system and apparatus and a non-transitory computer readable medium.

(ii) Related Art

The following workflow execution device to be used in a workflow system has recently been proposed. Even if an error occurs during the execution of a scenario describing a workflow, the scenario can be re-executed while maintaining the coherence of data to be processed (see Japanese Patent No. 3463020, for example).

The following workflow execution method is disclosed in this publication. While an activity is being executed, a scenario status is stored in a scenario status manager in association with a scenario instance ID. If an error is detected during the execution of the scenario, a scenario status column of the scenario status manager is updated to set an unfinished flag. When the scenario is re-executed, a new scenario instance ID is issued. Then, a scenario instance ID in which an unfinished flag is set is obtained from the scenario status manager. A search is then conducted by using this scenario instance ID as a key to obtain a stored data object. The data object ID appended to this data object is overwritten by a new data object ID to be numbered in association with the new scenario instance ID. The scenario is then re-executed.

SUMMARY

In a system in which components are constructed in a distributed manner, when an error occurs in one of the components during the execution of a workflow, the status of the system may not be updated successfully. In this case, when the system is restarted, processing which is not supposed to be re-executed may be executed.

Aspects of non-limiting embodiments of the present disclosure relate to an information processing system which is constituted by components constructed in a distributed manner and which is able to avoid inconveniences that may be caused by inconsistencies between items of information indicating the processing statuses of the distributed components when the information processing system is restarted due to the occurrence of an error in one of the components during the execution of a workflow, and also relate to an information processing apparatus and a non-transitory computer readable medium.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a manager, a memory, plural processors, a processing request storage, a processing result storage, and an output unit that are constructed in a distributed manner. The manager manages a workflow which is defined by combining one or more units of processing with each other in a certain manner, and generates a job to execute the workflow. In the memory, the manager stores a status of each unit of processing according to the job. The plural processors each execute a corresponding unit of processing. In the processing request storage, the manager stores a unit of processing as an execution request. In the processing result storage, the plural processors each store a processing result of a corresponding unit of processing after extracting the unit of processing from the processing request storage and executing the unit of processing. At a predetermined timing or when the information processing system is restarted after an occurrence of an error in one of the manager, the memory, and the plural processors, the output unit outputs information indicating a status of a corresponding unit of processing, based on a storage status of the processing request storage and that of the processing result storage.

BRIEF DESCRIPTION OF THE DRAWINGS

An exemplary embodiment of the present disclosure will be described in detail based on the following figures, wherein:

FIG. 2A illustrates an example of a workflow instance database (DB) record of a workflow DB;

FIG. 2B illustrates an example of a task instance DB record of the workflow DB;

FIG. 7 is a flowchart illustrating an example of the operation executed by the information processing system.

DETAILED DESCRIPTION

Figure 1:
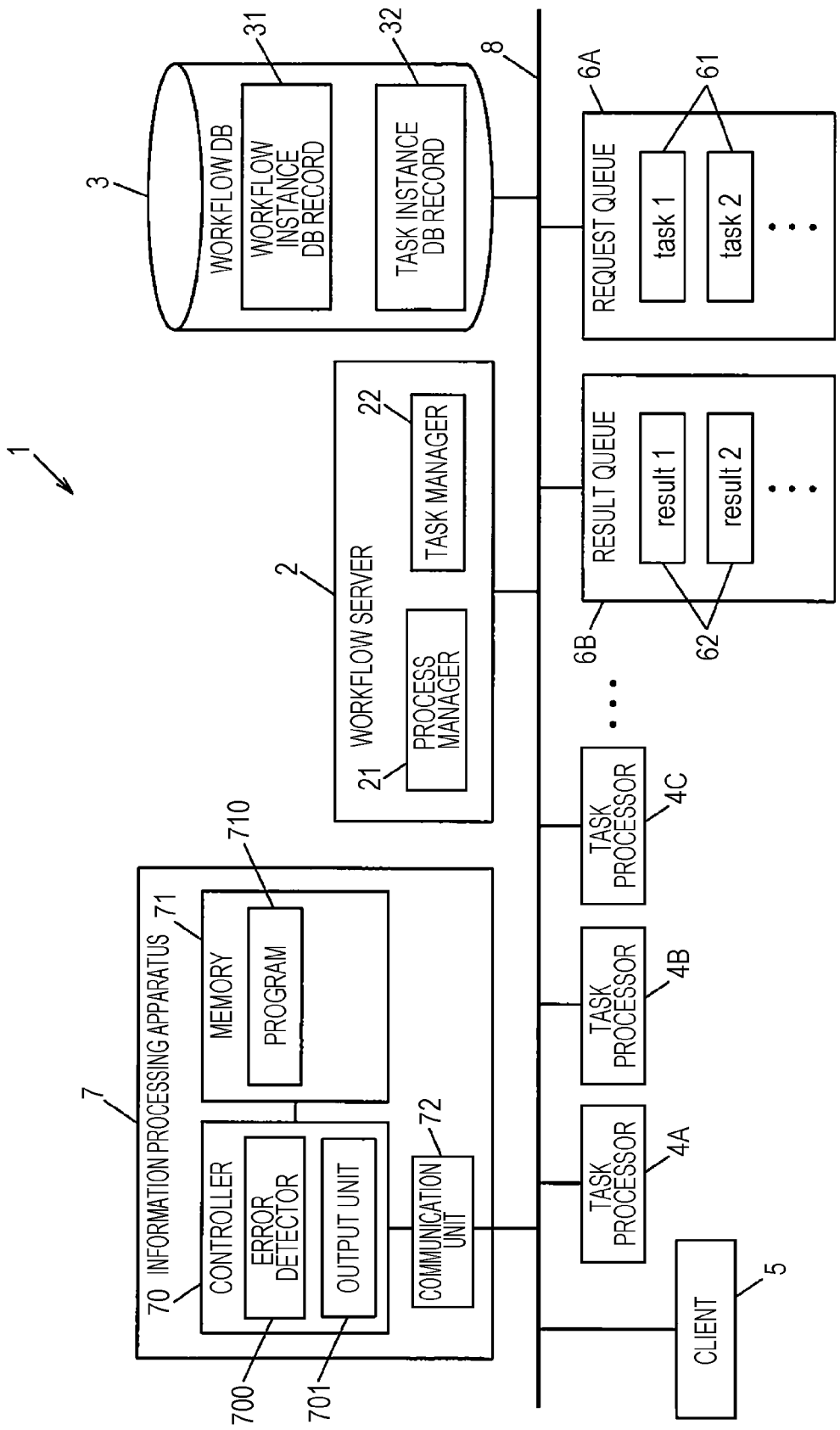
FIG. 1 is a block diagram illustrating an example of the configuration of an information processing system according to the exemplary embodiment of the disclosure.

An exemplary embodiment of the disclosure will be described below with reference to the accompanying drawings. In the individual drawings, elements having substantially the same function are designated by like reference numeral, and an explanation thereof will not be repeated.

Overview of Exemplary Embodiment

An information processing system according to the exemplary embodiment includes a manager, a memory, plural processors, a processing request storage, a processing result storage, and an output unit that are constructed in a distributed manner. The manager manages a workflow which is defined by combining one or more units of processing with each other in a certain manner, and generates a job to execute the workflow. In the memory, the manager stores a status of each unit of processing according to the job. The plural processors each execute a corresponding unit of processing. In the processing request storage, the manager stores a unit of processing as an execution request. In the processing result storage, the plural processors each store a processing result of a corresponding unit of processing after extracting the unit of processing from the processing request storage and executing the unit of processing. At a predetermined timing or when the information processing system is restarted after an occurrence of an error in one of the manager, the memory, and the plural processors, the output unit outputs information indicating a status of a corresponding unit of processing, based on a storage status of the processing request storage and that of the processing result storage.

The predetermined timing may be a timing (a) before the information processing system starts to execute a workflow or (b) after the information processing system has finished executing a workflow. These timings are a period of time in which the information processing system is not running (time period within a day before the information processing system starts operating or after it has finished operating). However, the predetermined timing is not limited to such timings.

Exemplary Embodiment

FIG. 1 is a block diagram illustrating an example of the configuration of an information processing system 1 according to the exemplary embodiment of the disclosure. The information processing system 1 is a system in which components are constructed in a distributed manner. The information processing system 1 includes a workflow server 2, a workflow database (DB) 3, multiple task processors 4A, 4B, 4C, . . . (hereinafter may also be collectively called the task processor 4 or the task processors 4) that executes processing, a client 5, a request queue 6A, a result queue 6B, and an information processing apparatus 7. These components are connected to one another via a network 8. The workflow server 2 is an example of a manager. The workflow DB 3 is an example of a memory. The task processor 4 is an example of a processor. The workflow server 2, the workflow DB 3, and the task processor 4 are examples of distributed components. The request queue 6A is an example of a processing request storage. The result queue 6B is an example of a processing result storage.

The request queue 6A and the result queue 6B may be disposed in the workflow server 2 or the information processing apparatus 7 or in an external server, such as a cloud server. If queue order control is executed in another component such as the workflow server 2, the request queue 6A and the result queue 6B are not restricted to the form of a queue and may each be a memory. The same memory may be used for the request queue 6A and the result queue 6B.

"Workflow" is a flow of processing. The information processing system 1 is a system that automates or semi-automates a flow of processing. Examples of processing are optical character recognition (OCR) processing for a document, such as a handwritten form, check and correction processing for OCR results, acknowledgement processing, and registration processing for document data.

In the workflow DB 3, the statuses of tasks are stored according to each job by a process manager 21 of the workflow server 2. In the workflow DB 3, a workflow instance DB record 31 (see FIG. 2A), a task instance DB record 32 (see FIG. 2B), and the definition of a workflow, for example, are stored. A job is constituted by at least one task. A task is an example of a unit of processing.

When requesting a task processor 4 to execute processing, a task manager 22 of the workflow server 2 stores a task 61 (represented by task 1, task 2, . . . , in FIG. 1) in the request queue 6A. The request queue 6A may be divided into individual portions according to each task processor 4, or may collectively be used for all the task processors 4. In the request queue 6A, one or multiple tasks 61 are stored in accordance with the processing order.

In the task 61, a workflow instance identification (ID), a task instance ID, task processor ID information for identifying a task processor 4 (such as a uniform resource locator (URL) or the name of the task processor 4), and information required for executing a task, such as parameters, are registered. The workflow instance ID is an example of identification information for identifying a workflow instance. The task instance ID is an example of identification information for identifying a task instance. The workflow instance is an example of a job.

When returning a processing result of a task 61 to the task manager 22, the task processor 4 stores a processing result 62 (represented by result 1, result 2, . . . , in FIG. 1) in the result queue 6B. In the result queue 6B, one or multiple processing results 62 are stored in accordance with the processing order. The result queue 6B may be divided into individual portions according to each task processor 4, or may collectively be used for all the task processors 4. The request queue 6A and the result queue 6B may be disposed in the same storage.

In the processing result 62, items of information, such as a workflow instance ID, a task instance ID, and an execution result of the task 61 (whether the task 61 has successfully been processed or abnormally terminated), are registered.

The task processors 4 are provided according to the type of processing. If the type of processing is OCR processing, the task processor 4 having an OCR processing function executes this OCR processing. When the task processor ID information included in a task 61 stored in the request queue 6A indicates a certain task processor 4, this task processor 4 extracts the task 61 from the request queue 6A and executes it. After executing the task 61, the task processor 4 stores a processing result 62 including an execution result indicating whether the task 61 has successfully been processed or abnormally terminated in the result queue 6B.

FIGS. 2A and 2B illustrate examples of records stored in the workflow DB 3. FIG. 2A illustrates an example of the workflow instance DB record 31. FIG. 2B illustrates an example of the task instance DB record 32.

The workflow instance DB record 31 has fields of a workflow instance ID, a workflow name, and a status. In the workflow instance ID, a workflow instance ID is recorded. In the workflow name, the name of a workflow is recorded. In the status, the execution status of a workflow instance is recorded. As the execution status, two statuses "Active" and "Completed" are used. "Active" means that a workflow instance has been generated. "Completed" means that a workflow instance has successfully been completed. Instead of the workflow instance ID, a job ID for identifying a job may be used.

The task instance DB record 32 has fields of a task instance ID, a task name, a workflow instance ID, a workflow name, and a status. In the task instance ID, a task instance ID is recorded. In the task name, the name of a task is recorded. In the workflow instance ID, a workflow instance ID is recorded. In the workflow name, the name of a workflow is recorded. In the status, the execution status of a task is recorded. As the execution status, four statuses "Ready", "Running", "Completed", and "Failed" are used. "Ready" means that a task instance has been generated. "Running" means that the task processor 4 is executing a task. Immediately after the task processor 4 is requested to execute a task, the status becomes "Running". "Completed" means that a task has successfully been processed. "Failed"

means that processing of a task has failed. Each of "Ready", "Running", "Completed", and "Failed" is an example of information indicating the status of a unit of processing. "Running" is an example of the status indicating that the task processor 4 has been requested to execute a unit of processing. "Completed" is an example of information that a task 61 has successfully been processed. "Failed" is an example of information that a task 61 has abnormally terminated.

(Configuration of Workflow Server)

The workflow server 2 includes the process manager 21 and the task manager 22.

The process manager 21 manages a workflow in which a flow of plural processing operations is defined. The process manager 21 reads the definition of a workflow from the workflow DB 3, and generates and executes a workflow instance in accordance with an instruction from the client 5. That is, the process manager 21 selects a task to be executed based on the definition of a workflow, and delegates the subsequent control processing to the task manager 22. Upon receiving a processing completion message from the task manager 22, the process manager 21 selects the next task to be executed. If the process manager 21 receives an error message from an error detector 700, which will be discussed later, it notifies the client 5 of the occurrence of an error.

The process manager 21 stores the execution status of a workflow instance in the status field of the workflow instance DB record 31 shown in FIG. 2A. The process manager 21 also updates the execution status of the workflow instance according to the necessity. That is, when the process manager 21 has generated a workflow instance, it records "Active" in the status field of the workflow instance DB record 31 as the execution status, and updates the status to "Completed" when the workflow has successfully been completed.

(Configuration of Task Manager)

The task manager 22 manages the execution of a task that the process manager 21 has requested the task manager 22 to execute. Actual processing of a task is executed by the task processor 4.

When the task manager 22 requests the task processor 4 to execute processing, it records a task 61 selected by the process manager 21 in the request queue 6A. To obtain a processing result 62 of the task 61 from the task processor 4, the task manager 22 extracts the processing result 62 from the result queue 6B.

The task manager 22 records the execution status of a task 61 in the status field of the task instance DB record 32 shown in FIG. 2B. The task manager 22 also updates the execution status of the task 61 according to the necessity. That is, when the process manager 21 has requested the task manager 22 to execute a task 61 linked with a certain workflow instance, the task manager 22 records "Ready" in the status field of the task instance DB record 32 as the execution status of the task 61. Then, immediately before the task manager 22 requests the task processor 4 to execute the task 61, it updates the status of the task 61 to "Running". If a processing result 62 returned from the task processor 4 indicates that the task 61 has successfully been processed, the task manager 22 updates the status of the task 61 to "Completed". If the processing result 62 indicates that the task 61 has abnormally terminated, the task manager 22 updates the status of the task 61 to "Failed".

If the task manager 22 has updated the status of the task 61 to "Completed", it returns a processing completion message to the process manager 21. If the task manager 22 has updated the status of the task 61 to "Failed", it returns an error message to the process manager 21. When the status of the task 61 is "Running", the task processor 4 is executing the task 61, and the task manager 22 does not receive any control instruction from the process manager 21.

(Configuration of Information Processing Apparatus)

The information processing apparatus 7 includes a controller 70, a memory 71, and a communication unit 72.

The controller 70 is constituted by a central processing unit (CPU), an interface, and so on. The CPU is operated in accordance with a program 710 stored in the memory 71 so as to function as the error detector 700 and an output unit 701, for example. The error detector 700 may be disposed in the workflow server 2 or the workflow DB 3, instead of in the information processing apparatus 7. Alternatively, the error detector 700 may be disposed independently.

The memory 71 is constituted by a read only memory (ROM), a random access memory (RAM), a hard disk, and so on. The memory 71 stores various items of information, such as the program 710.

The error detector 700 regularly sends a check signal to the workflow serve 2, the workflow DB 3, and the task processor 4, for example, and detects the occurrence of an error according to whether a response signal is returned from these components to response to the check signal. If, for example, the workflow server 2, the workflow DB 3, or the task processor 4 has broken down, it is unable to send a response signal, and the error detector 700 detects that an error has occurred.

At a predetermined timing, such as before the information processing system 1 starts operating or after it has finished operating, or when the information processing system 1 is restarted after the error detector 700 has detected an error, the output unit 701 outputs information indicating the status of a task to the workflow server 2, based on the storage status of the request queue 6A and that of the result queue 6B. That is, concerning a workflow including a task 61 whose status stored in the workflow DB 3 is "Running", the output unit 701 outputs information indicating the status of this task 61, based on the storage status of the request queue 6A and that of the result queue 6B. "Storage status" is a status regarding whether a task 61 is stored in the request queue 6A or whether a processing result 62 is stored in the result queue 6B.

In the case of the occurrence of an error, if the status of a task 61 is "Running", it means that an error has occurred after the task manager 22 requested the task processor 4 to execute the task 61 and the task manager 22 has not yet obtained a processing result 62 of this task 61. In such a situation, three cases are considered: the task 61 which has not been processed by the task processor 4 is stored in the request queue 6A; a processing result 62 of this task 61 has not been obtained by the task manager 22 and remains stored in the result queue 6B; and the task 61 is not stored in the request queue 6A nor is a processing result 62 stored in the result queue 6B. The workflow server 2 has restarted and is thus no longer able to recognize its control state when it has requested the task processor 4 to execute the task 61.

When the task 61 is not stored in the request queue 6A and when a processing result 62 is stored in the result queue 6B, the output unit 701 outputs information indicating the status of the task 61 reflecting the processing result 62 to the task manager 22. If the processing result 62 indicates that the task 61 has successfully been processed, the output unit 701 outputs information that processing has successfully been completed (processing completion message, for example) to the task manager 22 as the information indicating the status of the task 61. If the processing result 62 indicates that processing has abnormally terminated, the output unit 701 outputs information that processing has abnormally terminated (error message, for example) to the task manager 22 as the information indicating the status of the task 61.

When the task 61 is stored in the request queue 6A and a processing result 62 is not stored in the result queue 6B, the output unit 701 outputs information that the task processor 4 is still executing the task 61 to the task manager 22. In this case, if a processing result 62 is not stored in the result queue 6B even after a predetermined time has elapsed, the output unit 701 outputs information indicating that an error may have occurred in the task processor 4 (warning, for example) to the task manager 22.

When the task 61 is not stored in the request queue 6A nor is a processing result 62 stored in the result queue 6B, the output unit 701 outputs information indicating a request to re-execute the task 61 to the task manager 22.

(Operation of Exemplary Embodiment)

An example of the operation executed by the information processing system 1 will now be described below with reference to FIGS. 3A through 7. FIGS. 3A through 6 illustrate an example of a flow of task processing. FIG. 7 is a flowchart illustrating an example of the operation executed by the information processing system 1.

(1) Task Processing Flow

Figure 3A:
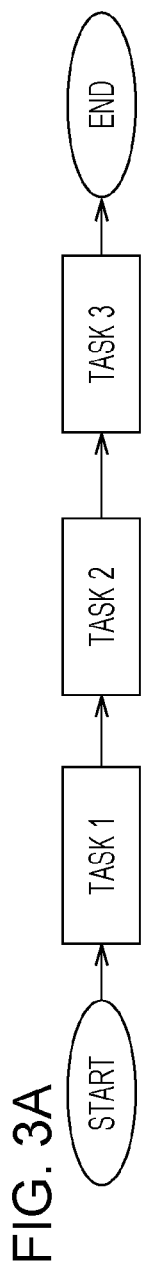
FIGS. 3A through 6 illustrate an example of a flow of task processing.

It is assumed that a workflow instance constituted by task 1, task 2, and task 3 to be continuously processed has been generated, as shown in FIG. 3A, and that task 1 is executed by the task processor 4A, task 2 is executed by the task processor 4B, and task 3 is executed by the task processor 4C.

Figure 3B:
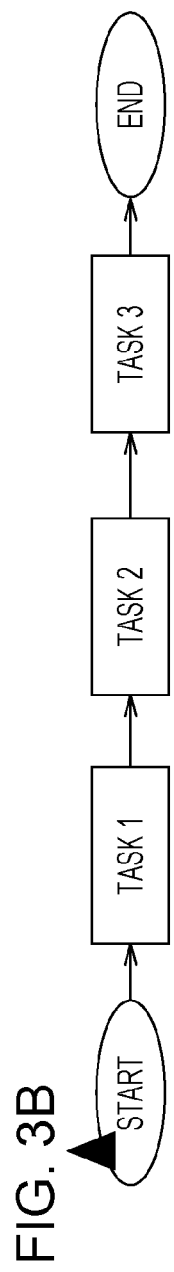

Upon receiving a request to execute processing from the client 5, the process manager 21 of the workflow server 2 records "testwf-id1" in the workflow instance ID field of the workflow instance DB record 31, "testwf" in the workflow name field, and "Active" in the status field, as shown in FIG. 3B.

Figure 3C:
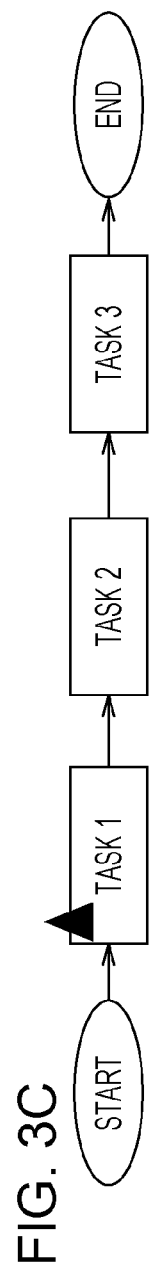

When the task manager 22 of the workflow server 2 has requested the task processor 4A to process task 1, it records "task1id1-testwf-id1" in the task instance ID field of the task instance DB record 32, "task1" in the task name field, "testwf-id1" in the workflow instance ID field, "testwf" in the workflow name field, and "Ready" in the status field, as shown in FIG. 3C.

Figure 4A:
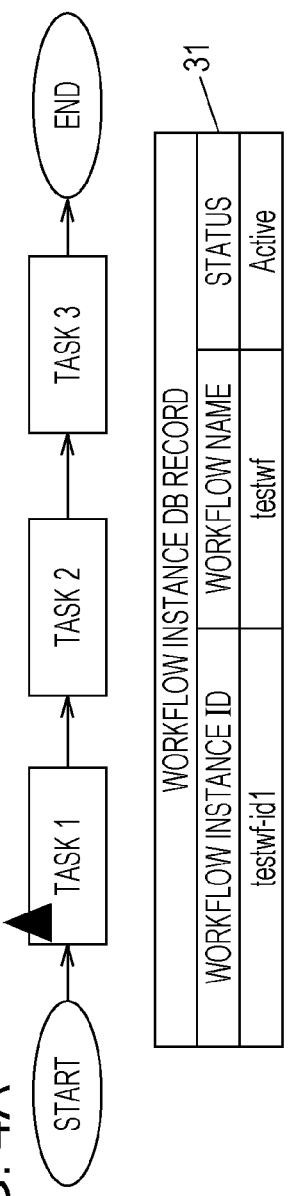

When the task processor 4A has started to process task 1, the task manager 22 updates the status of the task instance DB record 32 from "Ready" to "Running", as shown in FIG. 4A. In the "Running" status, the task processor 4A is executing task 1, and the process manager 21 is not in a position to control the processing of task 1.

Figure 4B:
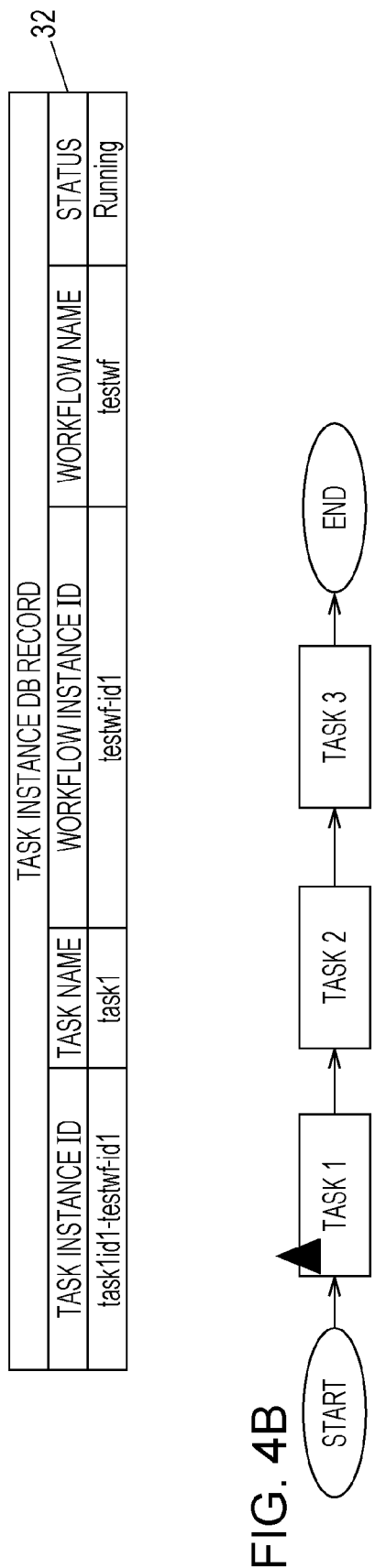

When the task processor 4A has finished processing task 1, the task manager 22 updates the status of the task instance DB record 32 from "Running" to "Completed", as shown in FIG. 4B.

Figure 5:
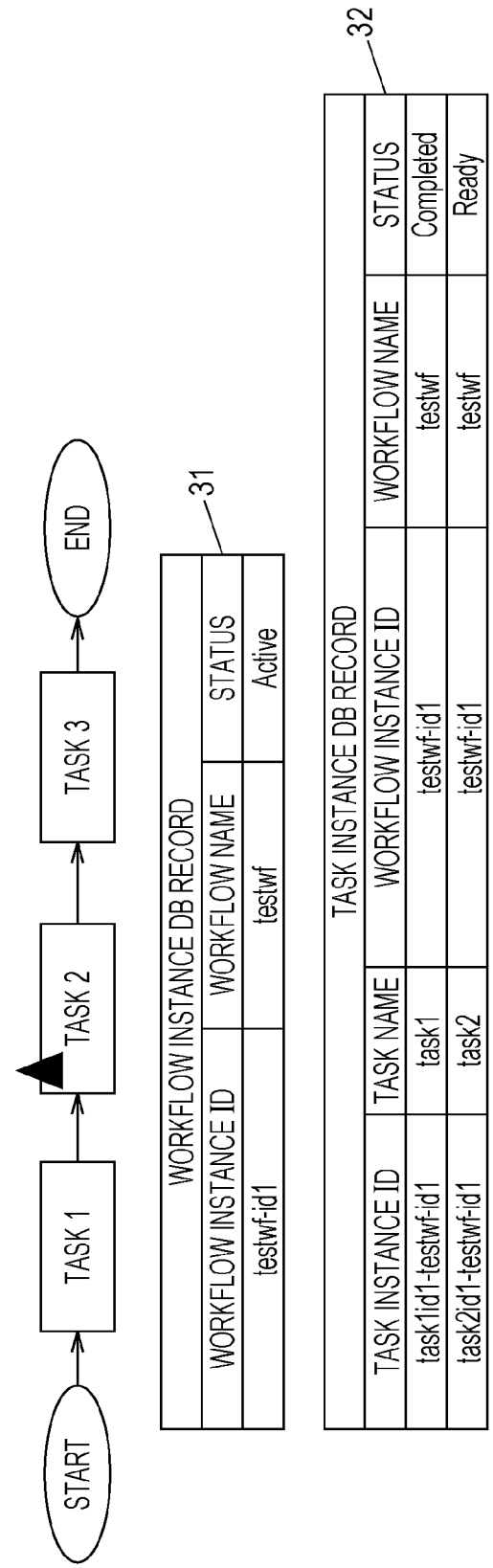

When the task manager 22 has requested the task processor 4B to process task 2, it creates a new record in the task instance DB record 32. That is, the task manager 22 records "task2id1-testwf-id1" in the task instance ID field of the second row of the task instance DB record 32, "task2" in the task name field, "testwf-id1" in the workflow instance ID field, "testwf" in the workflow name field, and "Ready" in the status field, as shown in FIG. 5.

Figure 6:
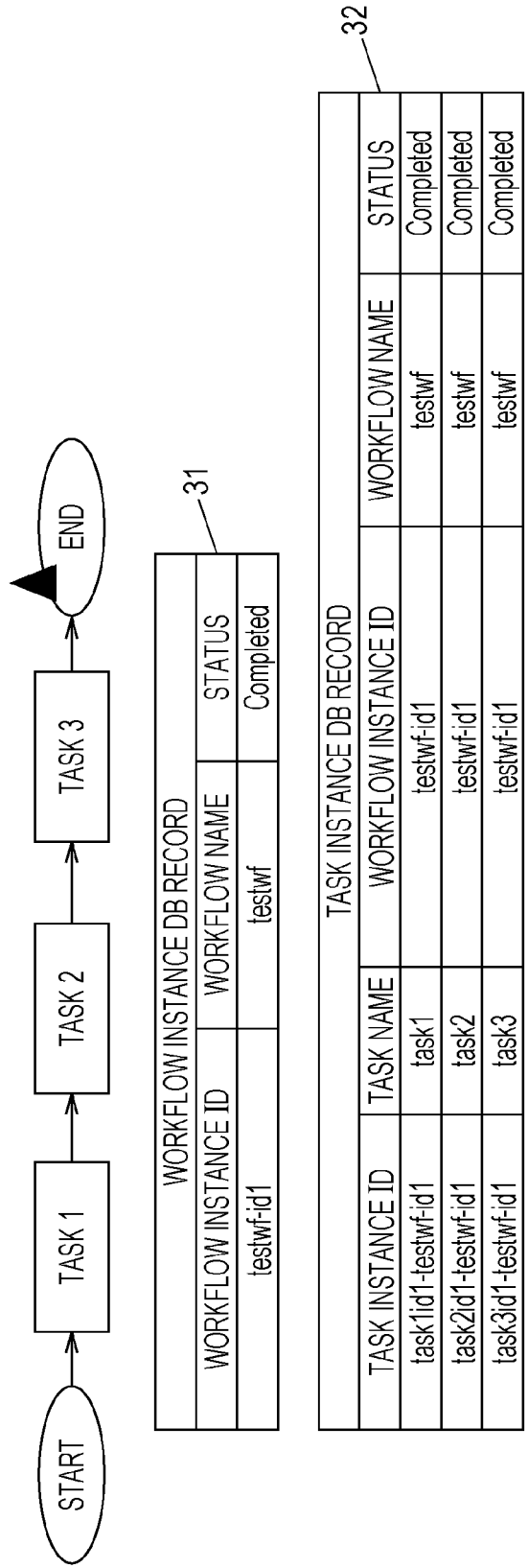

After the task processor 4B has finished processing task 2, the task processor 4C starts to process task 3. When the task processor 4C has finished processing task 3, the workflow has been completed. At this time, in the third row of the task instance DB record 32, "task3id1-testwf-id1" is recorded in the task instance ID field, "task3" is recorded in the task name field, "testwf-id1" is recorded in the workflow instance ID field, "testwf" is recorded in the workflow name field, and "Completed" is recorded in the status field, as shown in FIG. 6.

(2) Processing Executed in Case of Error or at Predetermined Timing

An example of the operation executed by the information processing system 1 will be described below with reference to the flowchart of FIG. 7. If the information processing system 1 is restarted after the error detector 700 has detected the occurrence of an error (YES in step S1), or if a predetermined timing has been reached (YES in step S2), the output unit 701 judges in step S3 whether there is a record in which the status of the task instance DB record 32 is "Running". If there is no such a record, the processing is terminated.

If there is a record in which the status of the task instance DB record 32 is "Running" (YES in step S3), the output unit 701 judges in step S4 whether a processing result 62 of the task 61 in this record is stored in the result queue 6B.

If a processing result 62 is stored in the result queue 6B (YES in step S4), the output unit 701 judges in step S5 whether the task 61 corresponding to this processing result 62 has successfully been processed. If a processing result 62 is stored in the result queue 6B, it can be assumed that an error has occurred after the task processor 4 finished processing the task 61.

If the execution result included in the processing result 62 stored in the result queue 6B indicates that the task 61 has successfully been processed (YES in step S5), in step S6, the output unit 701 updates the status of the task instance DB record 32 to "Completed", and notifies the process manager 21 that the task 61 has been processed. Upon receiving a processing completion message, the process manager 21 proceeds to processing of the next task 61.

If the execution result included in the processing result 62 stored in the result queue 6B indicates that the task 61 has abnormally terminated (NO in step S5), in step S7, the output unit 701 updates the status of the task instance DB record 32 to "Failed", and notifies the process manager 21 of the occurrence of an error in the task 61. In this case, the output unit 701 may instruct the process manager 21 to return to the previous task 61 or to delete the workflow instance. The output unit 701 may let the client 5 select whether an error message will be sent, the control process will return to the previous task 61, or the workflow instance will be deleted.

If a processing result 62 is not stored in the result queue 6B (NO in step S4), the output unit 701 judges in step S8 whether the task 61 is stored in the request queue 6A.

If the task 61 is stored in the request queue 6A (YES in step S8), in step S9, the output unit 701 waits for a predetermined time until a processing result 62 is stored in the result queue 6B. If a processing result 62 is not stored in the result queue 6B and the task 61 is stored in the queue 6A, it can be assumed that an error has occurred after the task manager 22 requested the task processor 4 to process the task 61. It is unknown, however, whether the task processor 4 has finished processing the task 61. In step S9, the output unit 701 thus waits for the predetermined time until a processing result 62 is stored in the result queue 6B.

If a processing result 62 is stored in the result queue 6B before the predetermined time elapses (YES in step S10), the output unit 701 proceeds to step S5.

If a processing result 62 is not stored in the result queue 6B even after the predetermined time has elapsed (NO in step S10), the output unit 701 issues a warning to the task manager 22 in step S11. The output unit 701 may also output a warning to the process manager 21, the error detector 700, and the client 5, as well as to the task manager 22.

If the task 61 is not stored in the request queue 6A (NO in step S8), that is, if a processing result 62 is not stored in the result queue 6B nor is the task 61 stored in the request queue 6A, it can be assumed that an error has occurred before the task manager 22 has requested the task processor 4 to process the task 61. The task processor 4 has not even started to process the task 61, and the output unit 701 requests the task manager 22 to re-execute the task 61 in step S12.

Although the exemplary embodiment has been discussed above, the present disclosure is not restricted thereto. Various modifications and implementations may be made without departing from the spirit and scope of the disclosure. For example, a time at which a task is stored in the request queue 6A may be embedded in the task, and a time at which a processing result is stored in the result queue 6B may also be embedded in the processing result. Then, tasks and processing results remain stored in the request queue 6A and the result queue 6B for a long time may be subjected to the processing of the exemplary embodiment.

At least one of the error detector 700 and the output unit 701 of the controller 70 may be constituted by a hardware circuit, such as a field programmable gate array (FPGA) or an application specific integrated circuit (ASIC).

Some of the components of the above-described exemplary embodiment may be omitted or changed without departing from the spirit and scope of the disclosure.

In the flowchart of the above-described exemplary embodiment, steps may be added, deleted, changed, or replaced without departing from the spirit and scope of the disclosure. The program used in the above-described exemplary embodiment may be provided as a result of being recorded in a computer readable recording medium, such as a compact disc-read only memory (CD-ROM). The program may be stored in an external server, such as a cloud server, and be used via a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system, comprising:
a server that manages a workflow which is defined by combining one or more units of processing with each other in a certain manner and that generates a job to execute the workflow;
a memory in which the server stores a status of each unit of processing according to the job;
a plurality of processors that each execute a corresponding unit of processing;
a processing request queue in which the server stores a unit of processing as an execution request;
a processing result queue in which the plurality of processors each store a processing result of a corresponding unit of processing after extracting the unit of processing from the processing request queue and executing the unit of processing; and
a main processor that outputs information indicating a status of a corresponding unit of processing at a predetermined timing or when the information processing system is restarted after an occurrence of an error in one of the server, the memory, and the plurality of processors, based on a storage status of the processing request queue and a storage status of the processing result queue,
wherein the server, the memory, the plurality of processors, the processing request queue, the processing result queue, and the main processor are constructed in a distributed manner.

2. The information processing system according to claim 1, wherein, for a unit of processing whose status stored in the memory indicates that one of the plurality of processors has been requested to execute the unit of processing, the main processor outputs information indicating the status of the unit of processing, based on the storage status of the processing request queue and the storage status of the processing result queue.

3. The information processing system according to claim 1, wherein the storage status of the processing request queue is a status regarding whether a unit of processing is stored, and the storage status of the processing result queue is a status regarding whether a processing result is stored.

4. The information processing system according to claim 2, wherein the storage status of the processing request queue is a status regarding whether a unit of processing is stored, and the storage status of the processing result queue is a status regarding whether a processing result is stored.

5. The information processing system according to claim 3, wherein, when the unit of processing is not stored in the processing request queue and when the processing result is stored in the processing result queue, the main processor outputs information indicating the status of the unit of processing in accordance with the processing result.

6. The information processing system according to claim 4, wherein, when the unit of processing is not stored in the processing request queue and when the processing result is stored in the processing result queue, the main processor outputs information indicating the status of the unit of processing in accordance with the processing result.

7. The information processing system according to claim 5, wherein, if the processing result indicates that the unit of processing has successfully been processed, the main processor outputs information indicating that the unit of processing has successfully been processed to the server as the information indicating the status of the unit of processing.

8. The information processing system according to claim 6, wherein, if the processing result indicates that the unit of processing has successfully been processed, the main processor outputs information indicating that the unit of processing has successfully been processed to the server as the information indicating the status of the unit of processing.

9. The information processing system according to claim 5, wherein, if the processing result indicates that the unit of processing has abnormally terminated, the main processor outputs information indicating that the unit of processing has abnormally terminated to the server as the information indicating the status of the unit of processing.

10. The information processing system according to claim 6, wherein, if the processing result indicates that the unit of processing has abnormally terminated, the main processor outputs information indicating that the unit of processing has abnormally terminated to the server as the information indicating the status of the unit of processing.

11. The information processing system according to claim 3, wherein, when the unit of processing is stored in the processing request queue and when the processing result is not stored in the processing result queue, the main processor outputs information indicating that a corresponding one of the plurality of processors is executing the unit of processing.

12. The information processing system according to claim 4, wherein, when the unit of processing is stored in the processing request queue and when the processing result is not stored in the processing result queue, the main processor outputs information indicating that a corresponding one of the plurality of processors is executing the unit of processing.

13. The information processing system according to claim 11, wherein, if the processing result is not stored in the processing result queue even after a predetermined time has elapsed, the main processor outputs information indicating a possibility of an occurrence of an error.

14. The information processing system according to claim 12, wherein, if the processing result is not stored in the processing result queue even after a predetermined time has elapsed, the main processor outputs information indicating a possibility of an occurrence of an error.

15. The information processing system according to claim 3, wherein, when the unit of processing is not stored in the processing request queue nor is the processing result stored in the processing result queue, the main processor outputs information indicating a request to re-execute the unit of processing to the server.

16. The information processing system according to claim 4, wherein, when the unit of processing is not stored in the processing request queue nor is the processing result stored in the processing result queue, the main processor outputs information indicating a request to re-execute the unit of processing to the server.

17. An information processing apparatus comprising:
a main processor that outputs information indicating a status of a unit of processing at a predetermined timing or when a system including the information processing apparatus is restarted, based on a storage status of a processing request queue and a storage status of a processing result queue, the unit of processing forming a job to execute a workflow, the workflow being defined by combining one or more units of processing with each other in a certain manner, the unit of processing being stored in the processing request queue as an execution request, a processing result of the unit of processing being stored in the processing result queue,
wherein a processing result of a corresponding unit of processing of each of a plurality of processors is stored in the processing result queue after the unit of processing is extracted from the processing request queue and the unit of processing is executed.

18. A non-transitory computer readable medium storing a program causing a computer to execute a process, the process comprising:
outputting information indicating a status of a unit of processing at a predetermined timing or when a system including an information processing apparatus is restarted, based on a storage status of a processing request queue and a storage status of a processing result queue, the unit of processing forming a job to execute a workflow, the workflow being defined by combining one or more units of processing with each other in a certain manner, the unit of processing being stored in the processing request queue as an execution request, a processing result of the unit of processing being stored in the processing result queue,
wherein a processing result of a corresponding unit of processing of each of a plurality of processors is stored in the processing result queue after the unit of processing is extracted from the processing request queue and the unit of processing is executed.

* * * * *